(No Model.)
A. F. TEMPLE.
BICYCLE.
No. 595,927. Patented Dec. 21, 1897.
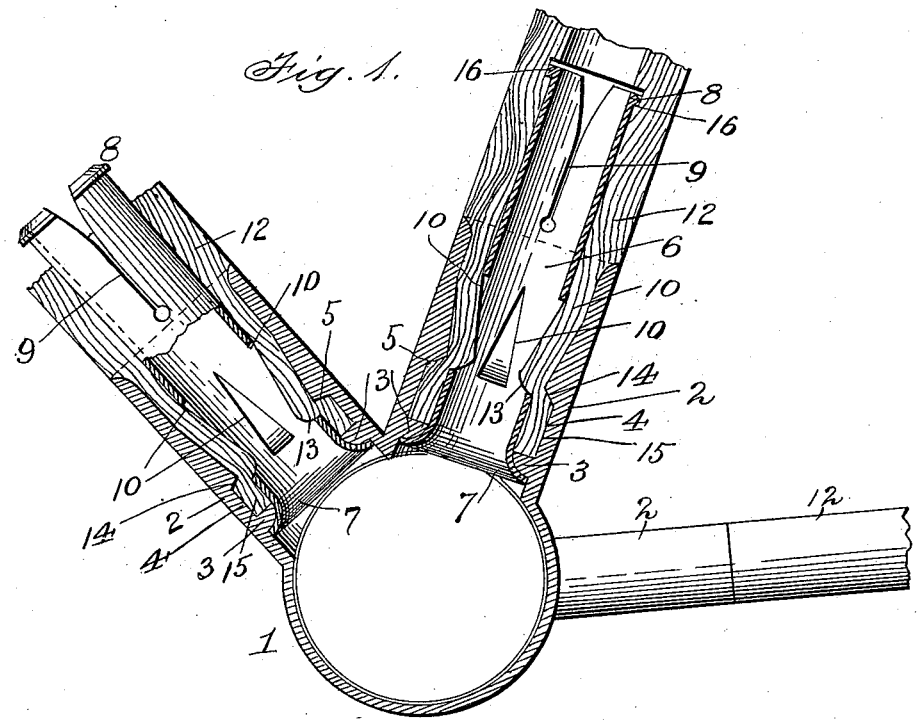
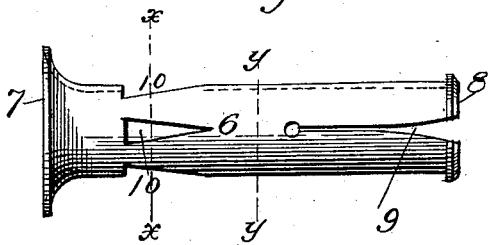
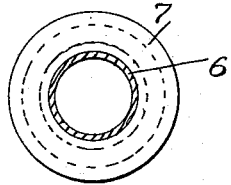
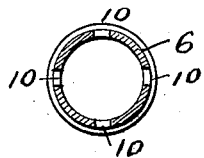
Witnesses
Franck L. Ourand.
J. McPaul.
Inventor
Ansel F. Temple
per Fred E. Tasker,
Attorney

United States Patent Office.

ANSEL F. TEMPLE, OF MUSKEGON, MICHIGAN.

BICYCLE.

SPECIFICATION forming part of Letters Patent No. 595,927, dated December 21, 1897.

Application filed February 17, 1897. Serial No. 623,892. (No model.)

*To all whom it may concern:*

Be it known that I, ANSEL F. TEMPLE, a citizen of the United States, residing at Muskegon, in the county of Muskegon and State of Michigan, have invented certain new and useful Improvements in Bicycles; and I do hereby declare the following to be a full, clear, and exact description of the invention, such as will enable others skilled in the art to which it appertains to make and use the same.

My invention relates to that class of bicycles in which the frame comprises a number of wooden tubes, the ends of which fit in metal sockets or joints; and the object of the invention is to provide improved means for connecting the tubes with the sockets, whereby they are rigidly held in place without liability of becoming disconnected.

The invention consists in the novel construction and combination of parts hereinafter fully described and claimed.

In the accompanying drawings, Figure 1 is a longitudinal sectional view of the crank hanger or bearing of a bicycle, showing my improvement applied thereto. Fig. 2 is an elevation of the metallic tube or ferrule detached. Fig. 3 is a section on the line $x\,x$, Fig. 2. Fig. 4 is a section on the line $y\,y$, Fig. 2.

In the said drawings the reference-numeral 1 designates the crank hanger or bearing of a bicycle of any ordinary or suitable construction, having formed integral therewith sockets 2, which receive the ends of the wooden tubes which comprise the bicycle-frame. Near their ends these sockets are formed with interior flanges 3, which are on one side beveled, as seen in Fig. 1. These sockets are also provided with annular recesses 4, forming shoulders 5, and from thence they taper in a curved line to the outer ends.

The numeral 6 designates a metal tube or ferrule, the inner end of which is formed with a curved flange 7, corresponding with the flange 3, against which it bears. The opposite end of said tube or ferrule is formed with a flange 8 and is split or formed with diametric triangular slots 9. Near the inner ends the tube or ferrule is formed with a number of triangular openings 10.

The numeral 12 designates the wooden tubes which form the bars of the frame, formed near each end with interior offsets 13, adapted to engage with the openings 10 and with a peripheral depression 14, corresponding with the interior curved tapering portion of the socket with which it engages. The end of the socket is also formed with an offset 15, which engages with the recess 4 in the socket and with an annular groove 16, with which the flange 8 of the metal tube or ferrule engages.

It will of course be understood that each of the sockets or joints of the bicycle-frame is formed similarly to those above described for the crank-hanger and each end of the wooden tubes also formed as described and provided with the metal tube or ferrule.

In assembling the parts the metal ferrules are first driven into the ends of the wooden tubes, and the latter are then driven into the sockets of the frame, and the outer ends of the ferrules are then, by means of a suitable tool, spread outward, so as to engage with the shoulders at the inner ends of the sockets. This will cause the offsets 15 to engage with the recesses 4, the offsets 13 to pass through the openings 10, and the flanges 8 to engage with the grooves 16. The flanges 7 bear against the flanges 3 of the sockets. The object of splitting the outer ends of the tubes or ferrules is to allow them to give or yield to accommodate them to slight variations in the bore of the wooden tubes.

While I have described my invention as being employed in connection with bicycle-frames, it is obvious that it may be used with advantage generally where it is desired to rigidly connect a wooden tube with a metallic socket.

Having thus fully described my invention, what I claim is—

1. The combination with a metallic socket formed with an interior flange near one end, of the split metal tube or ferrule having flanges at each end, one of which engages with the inner side of the flange in the socket, and the wooden tube having an interior annular groove with which the other flange of said metal tube engages, substantially as described.

2. The combination with the socket having an interior flange at the inner end thereof, of the split metal tube having a flange at one end engaging with the inner side of the flange of the socket and formed with a number of holes or openings and the wooden tube having offsets engaging with said openings, substantially as described.

3. The combination with the metal socket having an interior flange at the inner end, of the split metal tube or ferrule having a flange at each end one of which engages with the inner side of the flange in the socket, and formed with a number of holes or openings, the wooden tube having offsets engaging with said openings, and formed with an annular interior groove with which the other flange of the tube or ferrule engages, substantially as described.

4. The combination with the metal socket having an interior flange at the inner end, an annular recess and a curved tapering portion, of the metal tube or ferrule having a flange at each end and split or formed with slots at the outer end and formed with a number of openings near the inner end, and the flange at the inner end of said tube or ferrule engaging with the inner side of the flange of the socket, the wooden tube having an annular offset at the inner end, and a series of inwardly-projecting offsets engaging with openings in said tube and formed with an annular interior groove, substantially as described.

In testimony whereof I affix my signature in presence of two witnesses.

ANSEL F. TEMPLE.

Witnesses:
WILLIAM CARPENTER,
DELIA PICHETTE.